(12) United States Patent
Egerer et al.

(10) Patent No.: US 11,561,358 B2
(45) Date of Patent: Jan. 24, 2023

(54) METHOD FOR THE CONTINUOUS PRODUCTION OF OPTICAL FIBRE WAVEGUIDE SENSORS MOUNTED IN A PERFORATED METAL HOLLOW PROFILE

(71) Applicant: NEXANS, Courbevoie (FR)

(72) Inventors: Ralf Egerer, Hannover (DE); Steven Dinkel, Hannover (DE); Nico Lange, Hannover (DE); Olaf Petersen, Hannover (DE)

(73) Assignee: NEXANS, Courbevoie (FR)

( * ) Notice: Subject to any disclaimer, the term of this patent is extended or adjusted under 35 U.S.C. 154(b) by 138 days.

(21) Appl. No.: 17/111,607

(22) Filed: Dec. 4, 2020

(65) Prior Publication Data
US 2021/0199910 A1 Jul. 1, 2021

(30) Foreign Application Priority Data
Dec. 5, 2019 (EP) .................................. 19306580

(51) Int. Cl.
*G02B 6/50* (2006.01)
*G02B 6/44* (2006.01)
(52) U.S. Cl.
CPC ............ *G02B 6/4488* (2013.01); *G02B 6/50* (2013.01); *G02B 6/4484* (2013.01)
(58) Field of Classification Search
CPC ...... G02B 6/4484; G02B 6/4488; G02B 6/50; B23K 26/21
See application file for complete search history.

(56) References Cited

U.S. PATENT DOCUMENTS 4,477,147 A 10/1984 Winter et al.
5,072,870 A * 12/1991 Ziemek ................ G02B 6/4488
228/148

(Continued)

FOREIGN PATENT DOCUMENTS

JP H05157589 6/1993
JP H10244384 9/1998

OTHER PUBLICATIONS

EU Search Report dated May 8, 2020.

*Primary Examiner* — Daniel Petkovsek
(74) *Attorney, Agent, or Firm* — Sofer & Haroun, LLP (57) ABSTRACT

A method for the continuous production of a thin-walled, perforated metal hollow profile with one or more fibre waveguides mounted therein. The method includes supplying of a flat metal strip at a first supply rate to a deforming device, which continuously deforms the metal strip into a metal hollow profile with a slot running in a longitudinal direction. Two opposite edges of the metal strip deformed into the metal hollow profile that lie flush against one another in a contact region extending in the longitudinal direction of the metal hollow profile are continuously welded to one another, drawn off from the welding region and perforated. The method further includes positioning a protective tube reaching into the welded metal hollow profile on the draw-off side to beyond the perforation point and supplying one or more fibre waveguides from one or more fibre unwinders via the protective tube, such that the fibre waveguide or waveguides are introduced into the perforated metal hollow profile from the guide or protective tube downstream of the perforation point in the drawing-off direction. The perforated metal hollow profile with the fibre waveguide or fibre waveguides mounted therein is received in a receiving unit.

15 Claims, 3 Drawing Sheets

(56) References Cited

U.S. PATENT DOCUMENTS

| | | | | |
|---|---|---|---|---|
| 5,380,977 A | * | 1/1995 | Yoshie | G02B 6/4484 |
| | | | | 219/121.63 |
| 5,582,748 A | | 12/1996 | Yoshie et al. | |
| 6,047,586 A | * | 4/2000 | Hannen | G02B 6/4488 |
| | | | | 72/262 |
| 2003/0059169 A1 | * | 3/2003 | Watanabe | G02B 6/3874 |
| | | | | 385/60 |
| 2021/0154768 A1 | * | 5/2021 | Egerer | B23K 26/262 |

* cited by examiner

METHOD FOR THE CONTINUOUS PRODUCTION OF OPTICAL FIBRE WAVEGUIDE SENSORS MOUNTED IN A PERFORATED METAL HOLLOW PROFILE

RELATED APPLICATION

This application claims the benefit of priority from European Patent Application No. 19 306 580.2, filed on Dec. 5, 2019, the entirety of which is incorporated by reference.

FIELD

The invention relates to the production of optical fibre waveguide sensors with an external casing composed of metal and perforated by drilled holes, in particular the continuous production of such fibre waveguide sensors with a metal casing.

BACKGROUND

Fibre waveguides for the optical transmission of signals, also referred to as optical waveguides or light conductors, are, depending on the application and requirements for mechanical stability and protection from environmental influences and hydrogen diffusion, encased with a shell composed of plastic and/or with a metal shell. Fibres in a metal shell are used for example in the case of undersea cables and are commonly also led as a communication channel in earth wires of high-voltage lines. The fibre waveguides surrounded with a metal shell are also referred to as Fibre in Metal Tube, or FIMT for short.

Glass fibres can also be used as sensors for various physical variables, for example for measuring pressures, temperatures, vibrations and other measured variables, for example in bridge structures, wind turbines or in oil and natural gas production systems. These fibre waveguide sensors are also often encased with a metal shell for protection especially from mechanical damage, metal shells of high-grade steel being used in particular because of the chemical resistance. In order to allow better transmission of the measured variable to the glass fibre through the metal shell, holes may be introduced into the metal shell.

One or more fibres may be laid in one metal tube. In order to avoid tearing or breaking of the fibre due to changes in length of the metal tube caused by temperature fluctuations or mechanical tensile stresses, the fibre may be contained in the metal tube with a greater length than that of the metal tube.

In the case of a known continuous process for the production of metal tubes with fibre waveguides mounted therein, a fibre waveguide or a bundle of fibre waveguides is supplied to a tube-forming process. In the tube-forming process, a flat strip composed of a metal, for example high-grade steel, is formed into a tube which is slotted in a longitudinal direction and which encases the fibre waveguide or the bundle of fibre waveguides. The flat strip formed into a tube is welded with a longitudinal seam along the slot. A process of this kind and a device configured therefor is indicated in document EP 0 727 679 A1, for example.

Since, when drilling the holes into the metal shell, the fibre waveguide guided therein may be damaged, and the entire production length can be rendered unusable by a single instance of damage of the fibre waveguide during the drilling, the holes are introduced into the metal shell before the fibre waveguide is introduced. Usually, the holes are already introduced into the metal strip, for example by punching, before it is formed into the metal hollow profile, as indicated in document JP H05 157589 A, for example.

If the welding is performed by means of arc welding methods such as for example tungsten inert gas welding (TIG), wall thicknesses smaller than 0.15 mm cannot be welded reliably. The tubes welded using the known arc method may also have a pronounced weld bead, which projects into the tube interior and exposes fibre waveguides mounted therein to the risk of mechanical damage. Furthermore, tubes with a diameter of less than Ø 4.0 mm cannot be produced using the known method. The dimensioning of the metal tube which encases the fibre waveguide or the bundle of fibre waveguides thus has a lower limit. This leads to a greater minimum bend radius and a high weight.

Figure 1:
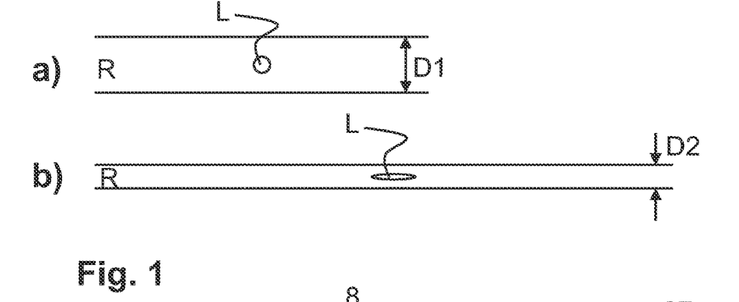
FIG. 1 shows a schematic representation of the changing of the geometry of a round hole introduced into a tube before a reduction of the diameter by a drawing process.

Laser welding methods allow the continuous production of metal tubes with diameters down to 2 mm, with fibre waveguides laid therein. In order to achieve even smaller diameters, welding of the metal strip formed into a closed metal hollow profile must be followed by performing a reduction of the diameter by means of drawing dies, rollers and other reducing tools. All of these methods for reducing the tube diameter share the common problem that a compressive stress in the circumferential direction leads to a plastic material flow, which has the effect of closing the perforations previously introduced. Even reductions of the diameter of over 20% lead to the holes closing completely. The changing of the geometry of perforations when reducing the tube diameter is schematically shown in FIG. 1. In FIG. 1 a), a segment of a tube R with a first diameter D1 and provided with a round hole L is shown before the diameter reduction. After the diameter reduction by a drawing process, the tube segment has become longer because of plastic material flow and has a smaller second diameter D2, but the previously round hole L has also been deformed into an elongated ellipse.

SUMMARY OF THE INVENTION

It is therefore an object of the present invention to propose an improved method and a corresponding device for the continuous production of fibre waveguide sensors mounted in a perforated metal hollow profile.

This object is achieved by the method according to Claim 1 and the device according to Claim 9. Further Developments and Embodiments are specified in each case in the dependent claims.

In the method according to the invention for the continuous production of a perforated metal hollow profile with one or more fibre waveguides mounted therein, a flat metal strip is firstly supplied, for example from a coil. The width of the supplied metal strip preferably already corresponds to the circumference of the metal hollow profile. If the supplied metal strip is wider than is required by the circumference of the metal hollow profile, or if the edges of the metal strip are not sufficiently smooth, it may be trimmed to size on one or two sides in a continuous process during the supply operation. In this description, the expression "metal" is used for all types of metals, including nonferrous metals, and for the alloys thereof, in particular high-grade steels. The rate at which the metal strip is supplied, or the length that is supplied per unit of time, may be detected continuously.

The metal strip available in the suitable width is continuously formed, in a single-stage or multi-stage deformation process, into a metal hollow profile which has the desired cross section. The deformation process may comprise bending, performed in a number of successive stages, in a longitudinal direction of the strip, for example on correspondingly configured rollers and profiles. Here, the cross section may be circular, oval, in particular upright oval, or of any desired polygonal shape. An upright oval cross section may offer advantages during the closure of the metal hollow profile and can be easily deformed into a circular metal hollow profile after the closure.

During the deformation process or following it, one or more individual fibre waveguides or one or more bundles of fibre waveguides, which are to be mounted in the hollow profile, are supplied. The fibre waveguide or waveguides may be encased with nonmetallic layers. In the case of multiple fibre waveguides being supplied, guide means which prevent the fibre waveguides from being twisted or entwined around one another may be provided. To prevent damage to the fibre waveguide or to the bundle of fibre waveguides as a result of a welding process by means of which the metal hollow profile is radially closed, the fibre waveguide or the bundle of fibre waveguides is guided within a guide or protective tube which, proceeding from the supply side, as viewed in the drawing-off direction, projects within the metal hollow profile as far as beyond the welding point and only thereafter exposes the fibre waveguide or waveguides.

In embodiments of the method, the length of the fibre waveguides supplied per unit of time may be determined continuously, for example by a continuous measurement of the supply rate. This may serve inter alia for determining an excess length of the fibre waveguide or waveguides introduced into the metal hollow profile. The excess length of the fibre waveguide or waveguides can compensate for differing linear expansions of the metal hollow profile and the fibre waveguide or waveguides when there are temperature fluctuations, in order that breaking or tearing of the fibre waveguide or waveguides does not occur.

The metal hollow profile has, after the deformation, a region running in the longitudinal direction in which the edges of the metal strip lie flush against one another. The edges which lie flush against one another are welded to one another along the abutting edge and are thus radially closed. The welding may be performed for example by a laser or by means of arc welding.

Below, the electromagnetic radiation radiated by the laser is referred to by the expression "light", even though the wavelengths of the electromagnetic radiation may lie in wavelength ranges not visible to humans.

In laser welding, the laser introduces into a point in the welding region light energy which, when it strikes the surface of the material for welding, is absorbed and converted into heat. In order to introduce an adequately high amount of energy into the material for welding, the light must be intensely focused. Intense focusing is therefore also required because the welding is intended to take place only in the contact region of the edges along the slot. The high energy density at the point at which the laser beam strikes the workpiece causes local melting of the material on both sides of the abutting edge, such that the melts flow into one another. The material solidifies again when it is no longer struck by the laser beam, and forms the weld seam. Owing to heat conduction within the metal, regions directly adjacent to the point struck by the laser beam can likewise warm up intensely and possibly melt. Specifically in the case of small cross-sectional dimensions of the metal hollow profiles to be produced, for example in the case of cross-sectional dimensions of smaller than 4 mm, the focusing of the laser beam is therefore of major importance in order to avoid the uncontrolled flow-off of liquefied material, or a breakaway of material.

Since the metal hollow profile in which the fibre waveguide or the fibre waveguides is/are received is led continuously past the static laser, a continuous weld seam which connects the two edges is produced. In order to prevent an uncontrolled flow-off of the liquid material, which is indeed present with a small wall thickness, the introduced laser power and the speed at which the tube is moved past the laser, must be coordinated with one another. With suitable coordination, smooth weld seams which require no reworking are formed at the outer side and at the inner side.

By contrast with known arc welding in accordance with the tungsten inert gas method (TIG) or metal inert gas method (MIG), which prevent a reaction of the melt with the ambient air by way of the inert gas atmosphere, and thus make high levels of seam quality possible, the laser welding used in the case of the invention makes it possible even without shielding gases for metals with material thicknesses smaller than 0.15 mm to be butt-welded to one another such that no weld bead forms on the inner side of the tube as a result of the better controllability of the energy input. However, also in laser welding, the welding point may be flowed around or covered by an inert shielding gas, for example argon. The use of a shielding gas atmosphere may be dependent inter alia on the material for welding and the thickness thereof. The shielding gas may be conducted into the welding region on the inner side of the metal hollow profile for example through an annular gap in the guide or protective tube.

The distribution of the input of energy by the laser may be performed either by way of focusing on a relatively large target area, such that available energy acts on a larger or smaller area as required, or by a particularly tightly focused laser beam being suitably moved back and forth. The focusing on a relatively large target area may also be realized by means of a laser profile which has a central focal point of high intensity and an annular region of lower intensity surrounding the central focal point. In this way, the welding region can be heated and cooled specifically along a temperature profile, which can result in a cleaner weld seam and can specifically influence the solidified structure. Furthermore, laser beams can be easily pulsed, wherein control of the input of energy is performed for example by way of the pulse duration and the pulse interval.

Welding by means of a laser, in particular heat conduction welding with a power density which does not lead to evaporation of the material for welding, generates a smooth, rounded weld seam which requires no further reworking. In the case of heat conduction welding, outside the region struck by the laser the energy only spreads into the workpiece by heat conduction. In general, the seam width is greater than the seam depth. If the heat cannot dissipate quickly enough, the processing temperature rises above the evaporation temperature, such that metal vapour forms, and the weld depth abruptly increases. The process then changes to deep welding. Here, the weld seam quality is reduced, and the process stability is influenced, such that the risk of welding defects increases. Damage to the guide or protective tube via which the fibres are introduced into the tube may even occur. This can be avoided by corresponding control of the laser power.

The high quality of the weld seam on the outer side and especially on the inner side of the tube produced according to the invention, which has no pronounced material bead along the weld seam, as a result of the finely controllable input of energy into the welding point, makes it possible to produce metal hollow profiles with thin wall thicknesses and small cross-sectional dimensions in a continuous process.

After the welding, the metal hollow profile is drawn off from the welding region by means of a feeding unit, for example by means of a draw-off collet, draw-off cleat, draw-off capstan or draw-off belt, and sent to a drilling device, which perforates the metal hollow profile in order to allow better transmission of the measured variable to the fibre waveguide or fibre waveguides.

The perforation is preferably performed by means of a laser. Various drilling methods may be used for this, for example single-pulse or percussion drilling, trepanning drilling or helical drilling.

In the case of single-pulse drilling, a short laser pulse with a high power density introduces the energy into the workpiece in a very short time, whereby the material melts and evaporates. The greater the pulse energy is, the more material melts and evaporates. During evaporation, the volume of material in the drilled hole increases abruptly and produces a high pressure. This vapour pressure drives the molten material out of the drilled hole.

In the case of percussion drilling, ultrashort laser pulses in the nanosecond range or shorter are used, whereby the material evaporates from the solid state directly by sublimation, i.e. without melting of the material—the component is in this case not warmed up, or only insignificantly. Shorter pulse lengths in the picosecond or femtosecond range may be conducive to the sublimation.

In the case of helical drilling, a laser is moved in an elliptical or circular path over the material, which is removed by the laser pulses. Like on a spiral staircase, the laser works its way down, the focus being able to readjust itself to always lie at the lowest level. As soon as the material is perforated, the edges can be smoothed, in order to obtain a largely cylindrical hole. In the case of helical drilling, a comparatively great amount of material is discharged upwards.

In the case of trepanning drilling, the drilled hole is likewise produced by multiple laser pulses. First, a starting hole is drilled by means of percussion drilling, and then is enlarged by moving the laser over the workpiece in a number of increasingly greater elliptical or circular paths. In the case of trepanning drilling, molten material can be driven out of the drilled hole downwards.

The drilling methods may also be alternately used sequentially, for example by first drilling a blind hole by means of helical drilling and then breaking through it by means of percussion drilling. In this way, only very little molten material gets into the interior of the metal hollow profile.

In the case of the aforementioned drilling methods in which more than one laser pulse is used, the laser may be carried along by a moving workpiece, for example by a correspondingly configured scanner or by the optical system being carried along. The pulse frequency of the laser and the feed rate of the workpiece are in this case synchronized.

The form of the drilled hole is in this case more or less freely selectable within the limits of the dimensions of the metal hollow profile. Thus, circular or oval holes can be drilled, or transverse or longitudinal slots can be introduced into the metal hollow profile.

In order to prevent damage to the fibre waveguide or waveguides or the plastic casing thereof by material or the laser radiation used for the drilling penetrating into the metal hollow profile during the drilling, according to the invention the guide or protective tube is taken to beyond the drilled point, such that the fibre waveguide or waveguides only lie free within the metal hollow profile after the drilled hole.

With respect to the wavelength of the laser used for the perforating, the material of the guide or protective tube preferably has a lower energy absorption or a greater reflectivity than the material of the metal hollow profile. In the case of a metal hollow profile composed of high-grade steel, for example, a laser with a wavelength greater than 600 nm may be used for drilling the holes. Light of these wavelengths is absorbed very well by high-grade steels, but is greatly reflected, or only poorly absorbed, by copper and other metals, and so copper and other metals can be advantageously used as the material for the guide or protective tube. In this way, the protective tube can protect the fibre waveguide or waveguides guided in it from damage for a multiplicity of drilled holes before the guide or protective tube itself is drilled through.

In order to further delay a change of the guide or protective tube becoming due while production is in progress, which means interrupting production, the guide or protective tube may be introduced into the metal hollow profile beyond the drilled point by a certain first length at the beginning of a production run and only withdrawn by a certain second length in each case after a specified number of drilled holes. As a result, the laser beam does not always strike the same point of the guide or protective tube, and also molten material of the metal hollow profile that has possibly penetrated into the interior of the metal hollow profile during the drilling cannot accumulate at one point and lead to the metal hollow profile becoming welded to the guide or protective tube. In the case of a radially closed guide or protective tube, it may also be turned by a specified angle about its longitudinal axis before being withdrawn by the certain second length after a specified number of drilled holes, and so a different point of the guide or protective tube is under a drilled hole. A combination of turning and withdrawing is also conceivable. The second length is preferably considerably shorter than the first length, and at least as long as the diameter of the perforation.

Instead of a radially closed profile, the guide or protective tube may also have a channelled form, which covers over the fibre waveguide or waveguides towards the drilled side. This form can be used especially whenever the drilled holes are only introduced from one side of the metal hollow profile. The channelled form has the effect of reducing the surface area of the guide or protective tube that can lie and rub against the inner wall of the metal hollow profile, and so introduction and withdrawal can be made easier.

In embodiments of the method, the cross-sectional dimensions of the metal hollow profile, that is to say for example the diameter, are reduced to a desired end size after the welding and before the perforation. For this purpose, the welded metal hollow profile may be led past drawing dies or forming profiles by means of one or more further feeding units. In the case of materials such as for example high-grade steel, reducing the cross-sectional dimensions may be used specifically for increasing the strength by cold forming, and thus also increase the resistance to mechanical environmental influences. Since the perforation is only performed after the primary reduction of the cross-sectional dimensions, the drilled holes are not deformed, or only slightly.

In embodiments of the method, the cross-sectional dimensions of the perforated metal hollow profile may be slightly reduced once again by a drawing process following the perforation. A reduction by 5-10% may for example lead to a still acceptable deformation or reduction in size of the drilled holes. In this way, a greater clearance can remain between the guide or protective tube and the metal hollow profile, reducing or preventing rubbing or attachment.

In order to avoid attachment of the material heated after the welding to following drawing and feeding devices, the metal hollow profile may be cooled by means of a cooling device lying downstream of the welding region, preferably before a following feeding unit. Furthermore, the welding structure may be specifically influenced by way of the cooling.

A filler gel which is introduced into the metal hollow profile may be used for further reducing the rubbing of the guide or protective tube against the inner side of the metal hollow profile, but is primarily used in embodiments of the method for the embedding of the fibre waveguide or the fibre waveguides in the metal hollow profile.

The filler gel may be introduced into the metal hollow profile via the guide or protective tube, for example via an annular gap of the guide or protective tube that is set apart from the opening exposing the fibres and surrounds the fibre waveguide or waveguides. The filler gel may have a lower viscosity at higher temperatures than at lower temperatures. In order inter alia to make it easier for the filler gel to be introduced, it may therefore be warmed, for example in a reservoir, before being introduced. Fine control of the gel temperature may be performed in a filling hose which connects the reservoir to the guide or protective tube, and/or in a filling head. During the introduction of the filler gel, the throughflow quantity per unit of time is measured and set such that the filler gel does not flow back counter to the direction of production.

The filler gel may be taken to beyond the perforation point within the guide or protective tube, or introduced already before that, for example directly at the point at which the reduction of the cross-sectional dimensions takes place. In the case of the latter variant, the guide or protective tube guiding the fibre waveguide is guided within the part of the metal hollow profile with reduced cross-sectional dimensions in the gel to beyond the point at which the metal hollow profile is perforated, which can make the withdrawing or turning of the guide or protective tube easier.

In order to be able to introduce the fibre waveguide or waveguides into the metal hollow profile with a defined excess length, in configurations of the method the perforated metal hollow profile may be elastically stretched. In this case, the fibre waveguide or waveguides are laid in the stretched metal hollow profile without tensile stress. Here, a filler gel in which the fibre waveguide or waveguides are embedded is preferably introduced into the metal hollow profile. The expression "excess length" is used in this description as the ratio of the length of the fibre waveguides to the length of the metal hollow profile surrounding them, in each case in the unstretched, stress-free state, which by definition is always greater than 1. Portions of the fibre waveguide lying outside the metal hollow profile are disregarded here.

The elastic stretching may be brought about for example by using a draw-off capstan, which introduces a tensile force into the metal hollow profile. The tensile force may be continuously monitored and can be controlled in a closed-loop fashion by corresponding control of the capstan drive, in order to prevent a permanent lengthening. The fibre waveguide or waveguides embedded in the filler gel within the metal hollow profile are not stretched by the tensile force. Rather, a corresponding additional length of the fibre waveguide or waveguides must be supplied such that the fibre waveguide or waveguides introduced into the metal hollow profile are substantially free from tensile stresses throughout the entire production process. As a result of the still low viscosity of the filler gel owing to the temperature, it is also the case during the elastic stretching that no significant transmission of force occurs between the inner side of the elastically expanded metal hollow profile and the fibre waveguide or the fibre waveguides. The cooling device lying downstream of the welding region may in this case be controlled in a closed-loop fashion so as to prevent cooling of the metal hollow profile to below a temperature at which the viscosity of the filler gel exceeds a predefined value. The elastically stretched metal hollow profile can be led multiple times around the draw-off capstan in the stretched state, such that the metal hollow profile and the filler gel introduced therein can cool further, in particular to a temperature at which the viscosity of the filler gel has greatly increased. Downstream of the draw-off capstan, there may be arranged a further feeding unit, for example a draw-off belt, which holds the metal hollow profile on the capstan. The further feeding unit leads the metal hollow profile from the draw-off capstan to a winder in the unstretched state and substantially free from tensile stresses. Here, "substantially free from tensile stresses" is to be understood to mean that the metal hollow profile is subjected to no or only negligible elastic stretching. The length of the metal hollow profile that is led away from the draw-off capstan per unit of time is continuously determined, for example by continuous detection of the speed.

Owing to the elimination of the tensile stress downstream of the draw-off capstan, the metal hollow profile elastically contracts again. The gel introduced in liquid form at elevated temperature has become more solid as a result of the cooling that has taken place in the meantime, and functions as a type of friction force promoter between fibre waveguide and the inner side of the metal hollow profile that transmits the movement of the contracting metal hollow profile to the fibre waveguide or waveguides. Because the cooled gel does not permit a completely free movement of the fibre in the metal hollow profile, in particular does not permit a simple longitudinal displacement over relatively long portions, the fibre waveguide or waveguides which lie in a substantially stress-free state in the metal tube at all times during the production process, and which are too long for the shorter metal hollow profile in the stress-free, unstretched state, is or are "compressed", as it were, on average over the entire length of the metal hollow profile. The fibre is in this case not actually compressed but is rather displaced out of its longitudinal axis in a buckled fashion in the interior of the metal hollow profile.

During the production process, the length of the metal hollow profile that is led away from the draw-off capstan per unit of time and the length of the fibre waveguide or of the fibre waveguides supplied per unit of time are continuously determined and averaged over a specified period of time in order to compensate for closed-loop control fluctuations of the drive control. Suitable time periods may lie in the range of minutes, wherein a longer duration on the one hand leads to more accurate results but on the other hand correspondingly lengthens the time until a closed-loop control intervention that may be required. From the averaged measured values, an excess length of the fibre waveguide or waveguides in the metal hollow profile produced during the time period is determined. In order to be able to dynamically correct deviations from a setpoint value, in addition to the detection of the length of the fibre waveguide or waveguides supplied per unit of time and of the length of the metal hollow profile that is led away from the draw-off capstan per unit of time, at least one controlled variable from the non-exhaustive first list comprising the supply rate of the metal strip or length of the metal strip supplied per unit of time, power of the laser, temperature of the filler gel, throughflow quantity of the filler gel per unit of time, speed of the drawing-off of the metal hollow profile from the welding region, tensile force exerted on the metal hollow profile and temperature of the metal hollow profile upstream of the draw-off capstan is continuously recorded. From the at least one controlled variable, at least one manipulated variable for the open-loop control of the power of the laser, for the closed-loop control of the heater of the reservoir, of the filling head and/or of the cooling device and/or for the open-loop control of a drive of one or more feeding units and/or of the draw-off capstan is detected.

In one or more embodiments of the method, the width of the supplied metal strip is measured and a cutting width is adjusted in a manner dependent on the measurement result and a specification value. The width corresponds approximately to the circumference along the neutral fibre of the metal hollow profile surrounding the fibre waveguide or the bundle of fibre waveguides. Here, the specification value can be varied and a deformation device can be correspondingly controlled in a manner dependent on the varying width of the metal strip, for example in order to adapt the material quantity required for a clean weld seam.

In one or more embodiments of the method, a temperature profile transversely with respect to the weld seam is measured. The measured temperature profile may be used to control the energy that is input into the welding point. The measured temperature profile may for example be compared with a specification profile, and the control of the energy that is input may comprise a variation of the focal diameter, of a path described by the focal point on the material for welding, and/or a variation of the pulse duration and/or of the pulse interval of the laser beam. It is likewise conceivable for the supply rate of the metal strip to be controlled in a closed-loop fashion in a manner dependent on the measured temperature profile. The measured temperature profile may also be stored for the purposes of quality management and documentation.

In one or more embodiments of the method, for this purpose the length of the metal strip supplied per unit of time is continuously measured. From the ratio of the length of the welded and reduced metal hollow profile that is led away per unit of time and the length of the metal strip that is supplied within the same time, it is possible to detect material deviations of the metal strip, for example different yield strengths, which can be directly taken into consideration in the closed-loop control of the production process.

In one or more embodiments of the method, the weld seam is inspected by means of ultrasound, x-rays, an eddy current measurement or other non-destructive measuring methods. The results of the inspection may for example be used for the control of the energy input into the welding point and/or of the supply rate.

A device according to the invention for the continuous production of a perforated metal hollow profile with at least one fibre waveguide mounted therein comprises a supplying unit configured for supplying a flat strip of the metal. The supplying unit may for example comprise a mount for a flat metal strip wound on a reel or a coil. The metal strip is unwound from the reel or the coil and sent to a deforming tool, which deforms the flat metal strip into the metal hollow profile such that the opposite edges of the flat metal strip abut flush against one another in a butt-jointed manner. The deforming device may for example have multiple rollers and profiles, for example drawing dies, which deform the metal strip as it passes through in the longitudinal direction to form the desired metal hollow profile. The deforming device may furthermore have two or more guide means which are spaced apart from one another in the longitudinal direction of the deformed metal strip or metal hollow profile and between which the edges are held so as to lie flush against one another at least at a point that is to be welded. If necessary, the strip may be guided laterally at one or more points upstream of and in the tool in order to minimize lateral movement of the strip.

The device furthermore comprises a welding device, which welds together the edges lying flush against one another between the guide means. The welding device may comprise for example a laser which radiates light with energy which causes local melting of the metal to both sides of the edges. The welding device may however also comprise an arc welding device.

As a result of the continuous drawing-off of the deformed and welded metal hollow profile, regions leave the welding region and the molten material solidifies again. The energy input into the material for heating it is coordinated with the material, the thickness thereof and the speed with which the metal hollow profile is led past the welding point, such that, although the material is melted in a region lying directly at the edges that lie flush against one another, no liquid material runs into the interior of the metal hollow profile. During the laser welding, the spacing between an optical system of the laser and the edges of the metal hollow profile that are to be welded can be kept constant by way of the guide means. In order to keep the position of the edges abutting against one another constant in relation to the optical system of the laser, upstream of the guide means that close the longitudinal slot there may be a guide blade arranged in the longitudinal slot lying between the edges in order to prevent axial twisting of the metal hollow profile.

The device furthermore comprises a supplying unit configured for supplying at least one fibre waveguide. The fibre waveguide or waveguides, which may be encased with a nonmetallic layer, is/are for example unwound from one or more fibre unwinders and introduced into the welded metal hollow profile via a guide or protective tube which projects from an entry side into the metal hollow profile and only ends beyond the welding point. If multiple fibre waveguides are supplied, the supplying unit may have a fibre guide by means of which the fibre waveguides are guided separately and twisting or intertwining of the fibres is prevented. Alternatively or in addition, the supplying unit may have one or more so-called fibre binders, which combine multiple fibres to form a bundle and wrap them with a thread. The supplying unit furthermore has a measuring unit for the continuous, preferably contactless, measurement of the length of the fibre waveguide or waveguides supplied per unit of time.

The device furthermore comprises one or more feeding units, which draw off the welded metal hollow profile from the welding region and send it to a drilling device, by means of which the metal hollow profile is perforated.

The drilling device may in particular comprise a laser, which may be configured according to the drilling method used, hole size and wall thickness of the metal hollow profile for single-pulse, percussion, trepanning or helical drilling and/or other drilling methods. The drilling device may be movably arranged, in order to be moved along at the feed rate of the metal hollow profile, or may have a movable optical system or a scanner for deflecting the laser beam, in order to move the laser beam along at the feed rate of the metal hollow profile if the drilled hole is not produced by the single-pulse drilling method.

In the case of the device according to the invention, the guide or protective tube via which the fibre waveguide or waveguides is/are introduced into the metal hollow profile is taken to beyond the drilling device in the drawing-off direction of the metal hollow profile, such that the fibre waveguide or waveguides only lie free within the metal hollow profile after introduction of the perforation. As a result, damage to the fibre waveguide or waveguides or their plastic casing by material penetrating into the metal hollow profile during the drilling or the laser radiation used for the drilling can be prevented.

With respect to the wavelength of the laser used for the perforating, the material of the protective tube preferably has a lower energy absorption or a greater reflectivity than the material of the metal hollow profile. In the case of a metal hollow profile composed of high-grade steel, for example, a laser with a wavelength greater than 600 nm may be used for drilling the holes. Light of these wavelengths is absorbed very well by high-grade steels, but is greatly reflected, or only poorly absorbed, by copper and other metals, and so copper and other metals can be advantageously used as the material for the protective tube. In this way, the protective tube can protect the fibre waveguide or waveguides guided in it from damage for a multiplicity of drilled holes before the protective tube itself is drilled through.

In order to further delay a change of the protective tube becoming due while production is in progress, which means interrupting production, embodiments of the device according to the invention may be configured to introduce the guide or protective tube into the metal hollow profile beyond the drilled point by a first length at the beginning of a production run and only withdraw it by a certain second length in each case after a specified number of drilled holes. As a result, the laser beam does not always strike the same point of the guide or protective tube, and molten material of the metal hollow profile that has possibly penetrated into the interior of the metal hollow profile during the drilling cannot accumulate at one point and lead to the metal hollow profile becoming welded to the protective tube. If a radially closed guide or protective tube is used, the device according to the invention may also be configured to turn the guide or protective tube by a specified angle about its longitudinal axis before being withdrawn by the certain second length after a specified number of drilled holes, and so a different point of the guide or protective tube is under a drilled hole. A combination of turning and withdrawing is also conceivable.

In embodiments, the device may be configured to introduce a channel-shaped guide or protective tube into the metal hollow profile to beyond the drilled point.

In embodiments of the device, a device for reducing the cross-sectional dimensions of the metal hollow profile to a desired end size, for example rollers, drawing dies and/or forming profiles, may be provided between the welding device and the drilling device. The metal hollow profile may be sent to the device for reducing the cross-sectional dimensions by means of one or more feeding units, for example by means of one or more draw-off collets, draw-off cleats or draw-off belts of known construction. Different feeding units may be combined. Upstream of the feeding unit, in embodiments of the device there may be arranged a cooling device which cools the metal hollow profile that has been heated by the welding down to a temperature at which attachment to following tools is effectively avoided and at which the tools leave no imprints in the metal hollow profile.

Furthermore, the welding structure may be specifically influenced by way of the cooling.

In embodiments of the device, a device for reducing the cross-sectional dimensions of the perforated metal hollow profile may be provided downstream of the drilled point in the drawing-off direction. The reduction may in this case be so small that the drilled holes are not deformed or reduced in size any more than is acceptable for an intended application.

The device may furthermore comprise a gel filling unit, which introduces a filler gel into the metal hollow profile in which the fibre waveguide or waveguides is/are mounted. The filler gel may have a viscosity which decreases with increasing temperature and likewise be introduced into the metal hollow profile via the guide or protective tube or via a tube which coaxially encloses it. In one embodiment, between the guide or protective tube and the tube which conducts the filler gel there is formed an annular gap for introducing the filler gel which lies downstream of the welding point, for example at the point at which the cross-sectional dimensions of the metal hollow profile are reduced to the desired end size, or beyond the drilled point. The guiding and protective tube for the fibre waveguide or waveguides may in this case be axially displaceable in the outer tube that encloses the protective tube and via which the filler gel is introduced. The gel filling unit may have a reservoir and be configured to introduce the filler gel into the metal hollow profile at a temperature at which the viscosity of the filler gel does not exceed a predetermined value. For this purpose, the reservoir, a filling hose connected thereto and/or a filling head connected thereto may be heatable, in particular in a manner controlled by a closed-loop temperature control unit. The gel filling unit is furthermore configured to continuously detect the volume of the filler gel that is introduced into the metal hollow profile per unit of time.

In embodiments, the device may be configured to introduce fibre waveguides into the metal hollow profile with an excess length. For this purpose, the device may comprise a draw-off capstan which is arranged downstream of the drilling device and by means of which a tensile force is exerted on the perforated metal hollow profile and elastically stretches it. The elastically stretched metal hollow profile may in this case be led multiple times around the draw-off capstan. The tensile force provided by the draw-off capstan may be continuously monitored by means of a force measuring device and adjusted by closed-loop control to a setpoint value. Alternatively, the draw-off capstan may be driven with a constant speed which is slightly higher than the speed of the preceding drive, and thus effects elastic stretching of the perforated metal hollow profile. The perforated metal hollow profile is led away from the draw-off capstan in a substantially stress-free state, such that the elastic stretching is ended. The fibre waveguide or waveguides is/are in this case introduced into the metal hollow profile without stretching.

The device may furthermore comprise a measuring unit which is arranged downstream of the draw-off capstan and serves for the preferably contactless determination of the length of the metal hollow profile led away from the draw-off capstan per unit of time and sent to a winder.

Following the draw-off capstan there may be arranged a further feeding unit, which holds the metal hollow profile on the draw-off capstan without causing significant elastic stretching of the metal hollow profile. The measuring unit for determining the length of the metal hollow profile led away from the draw-off capstan per unit of time and sent to a winder may be arranged between the draw-off capstan and the further feeding unit or downstream of the feeding unit.

In one or more embodiments of the device, a measuring device for ascertaining the tensile force is provided upstream of the deforming device. The ascertained tensile force may be sent as an actual value to a closed-loop control means and used, together with a setpoint value, for the closed-loop control of the drives of the device, for example for the closed-loop control of the feed rate of the metal strip.

In one or more embodiments, the device furthermore comprises a cutting unit which is arranged upstream of the deforming unit and by means of which one or both edges of the supplied flat metal strip are trimmed, wherein the width of the trimmed metal strip approximately corresponds to the circumference along the neutral fibre of the metal hollow profile. In these embodiments, it is possible without great outlay to produce metal hollow profiles with different circumferences by the supplied metal strip being cut to the required width and the further tools of the device being adapted.

In one or more embodiments of the device equipped with a cutting unit, a measuring unit for measuring the width of the cut-to-size metal strip is provided downstream of the cutting unit. On the basis of the measured values, the cutting unit can be controlled in order to maintain a desired width of the metal strip over a long period of time. The cutting unit may be supplied with corresponding specification values, with which the measured width of the metal strip are compared in order to generate a control signal for the setting of the cutting unit.

Parts which have been cut off at one or both edges of the strip may, in one or more embodiments, be sent to a device provided for receiving cutting remains.

In one or more embodiments, the device furthermore comprises a measuring unit for determining a temperature profile transversely and/or longitudinally with respect to the weld seam. The measured temperature profile may be sent to the welding device for the open-loop control of the output energy, to the supplying unit, to the feeding unit for the open-loop control of the supply rate and/or the temperature open-loop control for the filler gel.

In one or more embodiments, the device is furthermore configured to cover the welding point at the inside and/or the outside with a shielding gas. On the inside, the shielding gas may be introduced for example through a tube which encases the guide or protective tube and with the latter forms an annular gap at the welding point, or in a separate protective tube. On the outside, the shielding gas may be supplied at the welding point or in the vicinity thereof. In order to achieve a longer coverage with the shielding gas, the welded metal hollow profile may be led through a tube portion which is flooded with the shielding gas.

In one or more embodiments, the device furthermore comprises a measuring unit for measuring at least one dimension of the metal hollow profile after the welding and/or after the reduction of the cross-sectional dimensions. This measuring unit may be used for integrated quality control, in the same way as a measuring unit, provided in one or more embodiments, for inspecting the weld seam and/or material defects or inhomogeneities of the material. The dimensions may preferably be measured contactlessly, for example by means of a laser.

With the above-described method and the device, perforated metal hollow profiles which have diameters or cross-sectional dimensions down to below 1 mm and into which one or more fibre waveguides can be introduced with or without an excess length in the same working step can be produced at a high level of quality in a simple manner without laborious reworking. Apart from high-grade steels, other metals or metal alloys can of course also be used for the metal hollow profiles. Also perforated metal hollow profiles that deviate from circular or oval cross sections can be produced by the method according to the invention.

The smaller cross-sectional dimensions of the perforated metal hollow profile with the fibre waveguides embedded therein in comparison with those known from the prior art can contribute to the saving of metal and thus to the conserving of valuable resources. Apart from the weight of the product, its dimensions are also reduced, and so a greater length can be wound up on the same type of reel, and the transport and installation or laying can be facilitated.

The continuous measurement of the excess length makes it possible already while the production process is in progress for process parameters such as for example temperature and quantity of the filler gel introduced per unit of time, the tensile force acting on the metal hollow profile, and thus the elastic stretching, the fibre supply rate and the supply rate of the metal strip deformed into the metal hollow profile to be dynamically adapted in order to achieve a uniformly distributed excess length of the fibre waveguides. Here, it is also possible for deviations with regard to the material of the metal strip to be detected, such as for example deviating elastic yield strengths, such that a corresponding adaptation of the tensile force during the elastic stretching of the welded metal hollow profile or during the drawing for the purposes of reducing the dimensions can be performed while the process is in progress.

BRIEF DESCRIPTION OF THE DRAWING

The invention will be discussed in more detail below on the basis of an embodiment and with reference to the accompanying figures in an exemplary fashion. All of the figures are purely schematic and not to scale. In the figures.

Identical or similar elements are denoted by the same or similar reference designations in the figures.

FIG. 1 has already been explained further above with reference to the prior art and is therefore not explained again at this point.

EXEMPLARY EMBODIMENT

Figure 2:
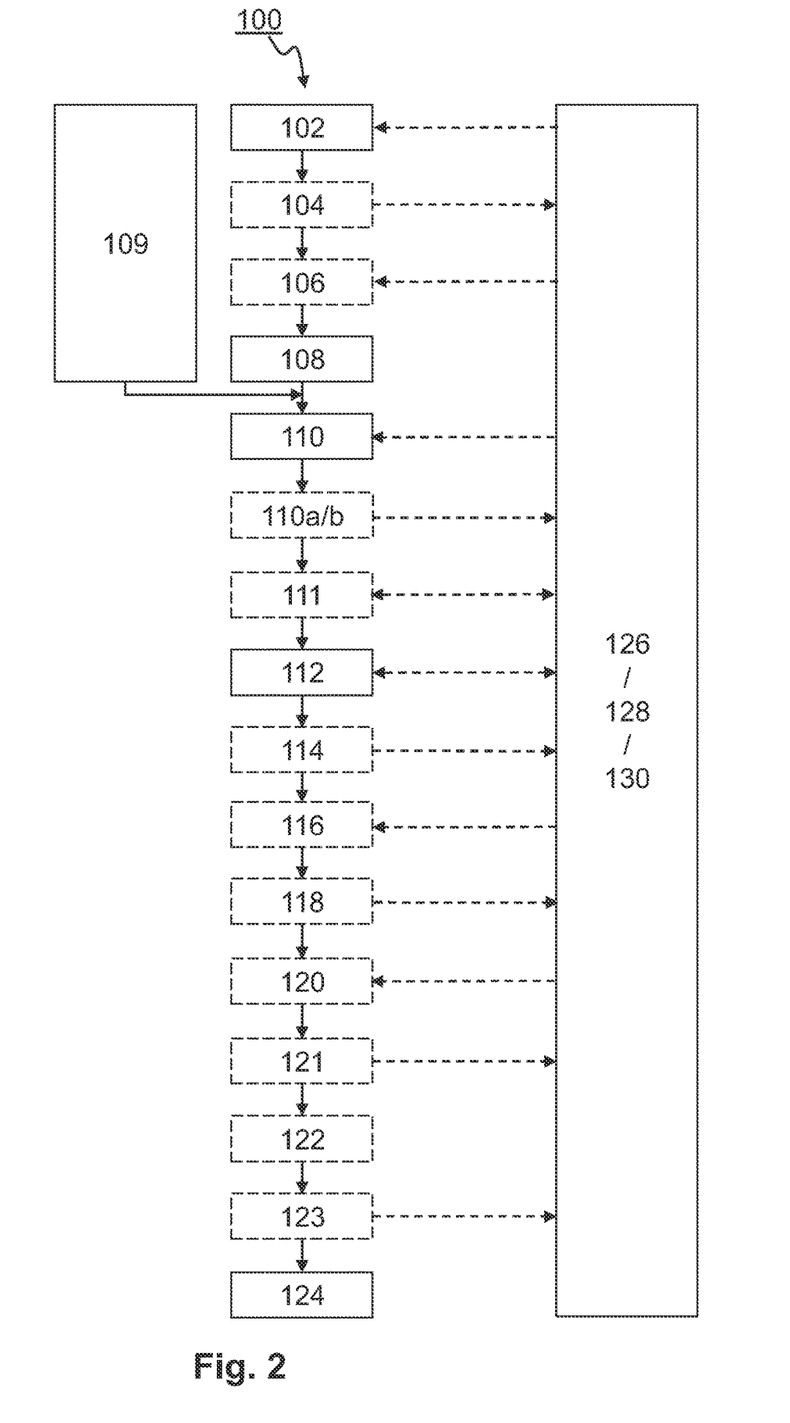
FIG. 2 shows an example of the method according to the invention given by way of example for the continuous production of optical fibre waveguide sensors mounted in a perforated metal hollow profile.

FIG. 2 shows steps of an exemplary method 100 for producing a perforated metal hollow profile, with fibre waveguides mounted therein, according to one aspect of the invention. In step 102 of the method, a flat metal strip is supplied at a first supply rate to a deforming device, for example is unwound from a coil. In the deforming device, the supplied flat metal strip is deformed in step 108 into a form corresponding to the desired metal hollow profile. The deformation may be performed for example by means of a roll forming tool.

Prior to the deformation, an optional step 106 in which one or both edges of the metal strip are trimmed or prepared in some other way may be performed in a cutting unit. In this way, even in the case of poor edge quality of the metal strip, the width of the strip can be uniformly and precisely set, and the edges can if necessary be prepared for a subsequent welding process. The cutting unit may be supplied with measured values from a measuring device which detects the width of the metal strip after the trimming process. The cutting remains may be received in a corresponding receiving device.

During the deformation, the edges of the metal strip are guided by means of guide elements such that a twisting prior to the welding is prevented, and the edges lying flush against one another are led in a defined position and with a defined spacing past a welding device. The guide elements may for example comprise one or more fin-type washers or guide blades and one or more guide bushings adapted to the geometry of the metal hollow profile and adapted to the hollow geometry to be produced. The closing of the geometry may be performed for example by means of drawing dies, closing rings or side-roller stages.

After the deformation, two opposite edges of the flat strip lie flush against one another in a contact region. In step 110, the edges which lie flush against one another in the contact region are continuously welded to one another. The welding is performed by means of a laser or some other welding device adapted to the material. If necessary, the weld seam may be covered on one or both sides by means of shielding gas in a manner adapted to the required weld seam quality.

After the welding, the metal hollow profile is drawn off from the welding region by means of a feeding unit and perforated in step 112, for example by means of a laser, which drills holes into the wall of the metal hollow profile.

Before that, in step 111, the metal hollow profile may be sent to a device for reducing the cross-sectional dimensions to a desired end size.

Before the welding in step 110, one or more fibre waveguides is/are introduced into the metal hollow profile from one or more fibre unwinders in step 109. According to the invention, the fibre waveguide or waveguides is/are led by means of a protective or guide tube under the welding region and also under the drilled point lying downstream of the welding region in the drawing-off direction, at which the welded metal hollow profile is perforated, and so the fibre waveguides only come out of the protective or guide tube in the already welded and perforated metal hollow profile.

Together with the fibre waveguide or waveguides, in step 109 a filler gel in which the fibre waveguide or waveguides is or are embedded may be introduced into the metal hollow tube. The filler gel may be introduced into the metal hollow profile via the guide or protective tube, for example via an annular gap of the guide or protective tube that is set apart from the opening exposing the fibres and surrounds the fibre waveguide or waveguides. The filler gel may have a lower viscosity at higher temperatures than at lower temperatures.

The length of the fibre waveguide or waveguides supplied per unit of time, and possibly the introduced quantity of filler gel, may likewise be determined continuously in step 109. The filler gel and the metal hollow profile may be temperature-controlled in step 116 after the welding such that the viscosity of the filler gel does not exceed a predetermined value. Before that, in step 114, the temperature may be measured. If the embedding of fibres is to be performed with a defined excess length, in step 120 the metal hollow profile may be elastically stretched, for example by a force exerted on the metal hollow profile by means of a draw-off capstan. The tensile force may in this case be monitored in step 121. The elastically stretched metal hollow profile may then be cooled in the stretched state, step 122, such that the viscosity of the filler gel increases, before in step 124 it is sent to a receiving device, in order to be received, after the elastic stretching has subsided or reduced. As a further measured value for the determination of the excess length in step 126, the received length of the metal hollow profile can be continuously determined in step 123. The recording 128 of controlled variables at various points of the method and the corresponding determination 130 of manipulated variables for drives and actuators of the device 200 are indicated in the figure by the dashed arrows. In particular, the detection of the supplied lengths of fibre waveguides and metal strip and also the length of the finished product sent to the receiving device for being received can be used to ascertain a present excess length and adjust it by controlling process parameters, such as for example the rate at which the strip is supplied, the power of the welding device, the temperature and throughflow quantity of the filler gel, the feed rate after welding, the tensile force for the elastic stretching, etc.

For the monitoring of the quality of the weld seam, it is possible in an optional step 110*a* for the temperature profile transversely and/or longitudinally with respect to the weld seam to be determined. The ascertained temperature profile may be sent to a controller of the laser device and to other elements of a device which implements the method, in particular also to one or more drives which perform closed-loop control of the supply rate of the metal strip or of the speed with which the welded metal hollow profile is drawn off from the welding region.

The method may optionally also comprise an ascertainment of the tensile force on the strip prior to the deformation in step 104. The ascertained tensile force may likewise be sent to one or more drives as a measured variable for the closed-loop control.

The method may furthermore comprise an optional step 110*b* in which one or more dimensions of the welded metal hollow profile are determined. The ascertained dimensions may be supplied especially as input variables for the closed-loop control of the deformation process and of the cutting process for the setting of the width of the strip.

The method may also comprise after the welding an optional step 118, in which the quality of the weld seam and/or the material for welding are inspected for material defects in a non-destructive fashion, for example by means of eddy current inspection, ultrasound or x-rays.

Not illustrated in FIG. 2 are subsequent processes by means of which the metal hollow profile is cut into pieces, or an encasing of the metal hollow profile with an insulating or protective layer is performed.

Figure 3:
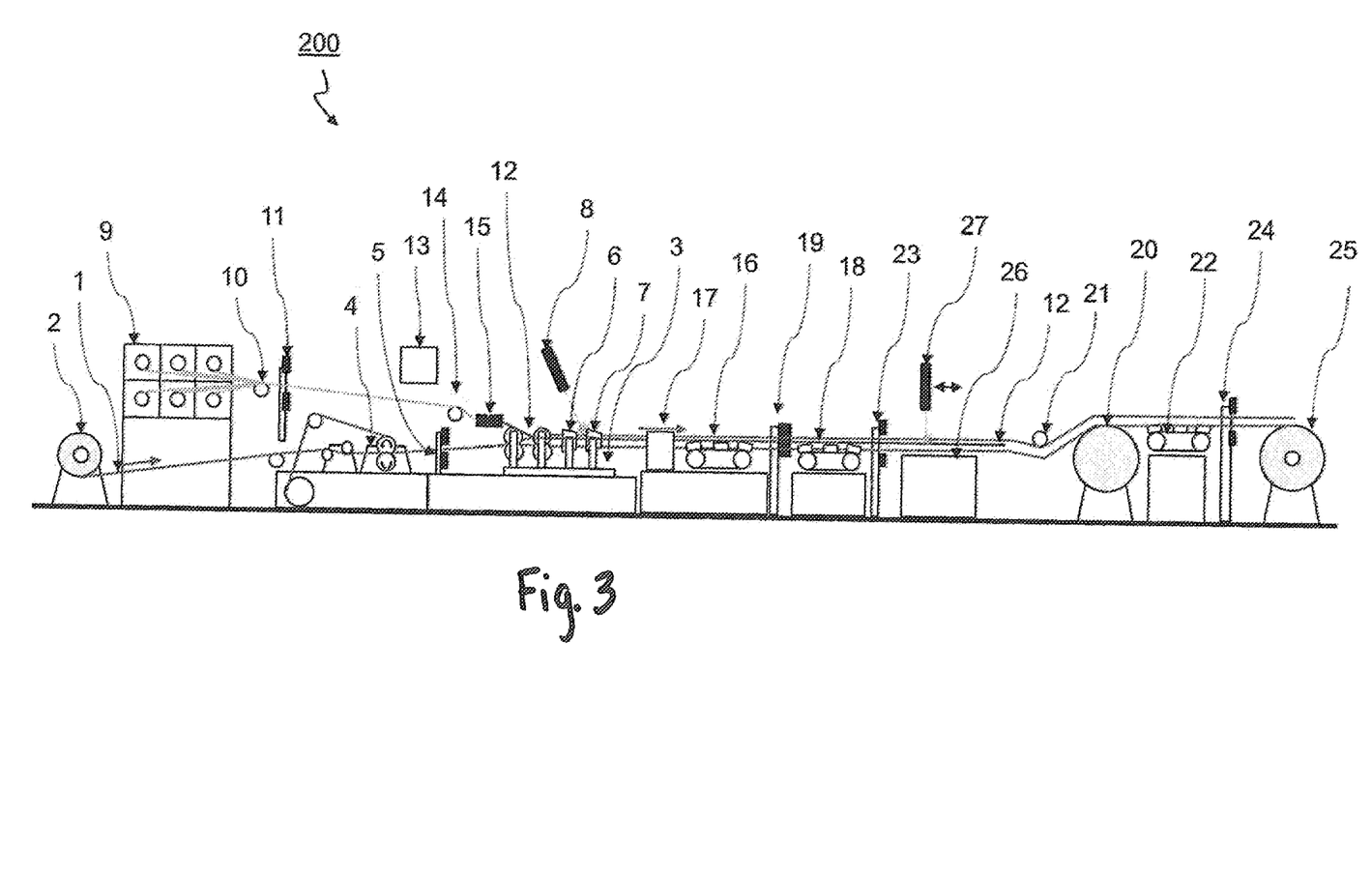
FIG. 3 shows an example of a device according to the invention given by way of example for the continuous production of optical fibre waveguide sensors mounted in a perforated metal hollow profile.

FIG. 3 shows an example of a device 200 according to the invention given by way of example for the continuous production of perforated metal hollow profiles with one or more fibre waveguides mounted therein. From a reel or unwinder 2, a thin metal strip 1, for example a strip composed of high-grade steel, is unwound. The metal strip 1 is sent to a roll forming tool 3, 7, by means of which it is brought into the form of the desired metal hollow profile, for example is formed into a longitudinally slotted round tube.

Between the reel or unwinder 2 and the roll forming tool 3, 7 there may be provided a cutting device 4, which cuts the metal strip 1 to a required width or cuts one or both edges of the metal strip 1 in order to obtain clean and smooth edges. A receiving device may be provided for receiving cut-off parts of the metal strip 1. The width of the cut-to-size metal strip 1 may be inspected in a strip width measuring device. The measurement results may be sent to the cutting unit 4 for the purposes of closed-loop control. Furthermore, between the reel or unwinder 2 and the roll-forming tool 3, 7 there may be arranged a measuring device for ascertaining the tensile force, the measured values of which can be used for example for the closed-loop control of drives of the device 200. A measuring device 5 for monitoring the strip speed and/or length of the supplied metal strip may likewise be provided. Before the closing of the metal hollow profile, one or more fibre waveguides are supplied by a supplying device 9, and a filler gel in which the fibre waveguide or waveguides received in the metal hollow profile are mounted is supplied by a gel filling unit 13. The fibre waveguides may be guided in a fibre guide 10, which prevents intertwining of the fibres. The filler gel may be supplied via a filling hose 14 to a filling head 15, which is connected to a guide or protective tube 12 through which the fibre waveguide or waveguides is/are also introduced into the metal hollow profile. The length of the fibre waveguides supplied per unit of time may be monitored in a first measuring unit 11. The gel filling unit may be configured for detecting the quantity of filler gel supplied per unit of time, for example by means of a throughflow meter. Those edges of the strip which lie against one another after the forming of the metal hollow profile may be led in front of a laser welding device 8 by one or more guide elements 6 such that twisting of the metal hollow profile prior to the welding is prevented, and the spacing with which it passes through below an optical system of the laser welding device 8 is maintained. The guide elements 6 may comprise one or more fin-type washers or guide blades and one or more guide bushings adapted to the metal hollow profile forming the outer conductor. The geometry of the metal hollow profile for welding is closed by means of drawing dies, closing rings, side-roller stages or guide bushings 7, such that the edges of the metal strip 1 deformed into the metal hollow profile lie against one another in the region of the laser welding device 8. The welding region may be covered with a shielding gas, for example argon, by means of a shielding-gas device which is not illustrated in the figure, in order to prevent reactions of the material for welding with the atmosphere. The feed of the welded metal hollow profile is performed by means of a feeding unit 16. The feeding unit 16 may for example comprise one or more draw-off collets, draw-off cleats or draw-off belts, or combinations of these.

The metal hollow profile drawn off from the welding region may be cooled by means of a cooling device 17 to a temperature at which the viscosity of the filler gel does not exceed a predefined value and/or the risk of attachment of the metal hollow profile to following guiding, feeding and/or deforming units is reduced.

By means of a further feeding unit 18 and drawing die mounts 19, the dimensions of the metal hollow profile are reduced to a desired end size before a wall of the metal hollow profile is perforated by a laser drilling device 27.

In the case of the device 200 according to the invention, the guide or protective tube 12 via which the fibre waveguide or waveguides is/are introduced into the metal hollow profile is taken to beyond the drilling device 27 in the drawing-off direction of the metal hollow profile, such that the fibre waveguide or waveguides only lie free within the metal hollow profile after introduction of the perforation. As a result, damage to the fibre waveguide or waveguides or their plastic casing by material penetrating into the metal hollow profile during the drilling or the laser radiation used for the drilling can be prevented. The drilling device 27 or an optical system of the drilling device may be arranged on a movable guide 26, and so the drilling device or its optical unit can follow the movement of the metal hollow profile running through and a relative movement can be compensated.

A tensile force which brings about elastic stretching may be exerted on the perforated metal hollow profile by means of a draw-off capstan 20. The elastically stretched metal hollow profile may be led multiple times around the draw-off capstan 20, wherein towards the draw-off side the temperature decreases further, and the viscosity of the filler gel increases. Before the introduction of the tensile force, the temperature of the metal hollow profile may be contactlessly ascertained by a temperature measuring device and sent to the cooling device 17 as a controlled variable. Further temperature measurements may be arranged downstream of the welding region, downstream of the cooling device 17, downstream of the drawing dies 19 and 23 and/or downstream of a further feeding unit 22, which holds the metal hollow profile on the draw-off capstan, in the direction of production. From the draw-off capstan 20, the metal hollow profile is sent substantially free from tensile stresses to a winder 25. In this case, the length of the product received per unit of time is contactlessly determined by a second measuring device 24. As a result of the elimination of the tensile stress, the elastic stretching is ended, and the fibre waveguide or waveguides is/are compressed into a buckled form by the filler gel, owing to the now higher viscosity, during the contraction of the metal hollow profile, such that, in relation to the length of the metal hollow profile received by the winder, a greater length of the fibre waveguide or waveguides is received. A control unit which is not illustrated in the figure continuously ascertains a present excess length of the fibre waveguides from the difference between the length measurements of the first and second measuring devices 11 and 24. Furthermore, present process parameters or reference variables, such as for example the supply rate of the metal strip, laser power, gel temperature, gel throughflow, feed rate, tensile force and tube external temperature, are recorded, and from these actuation values for the laser power, gel temperature, feed rate, cooling power and/or tensile force are determined for the automatic closed-loop control of the excess length.

Figure 4:
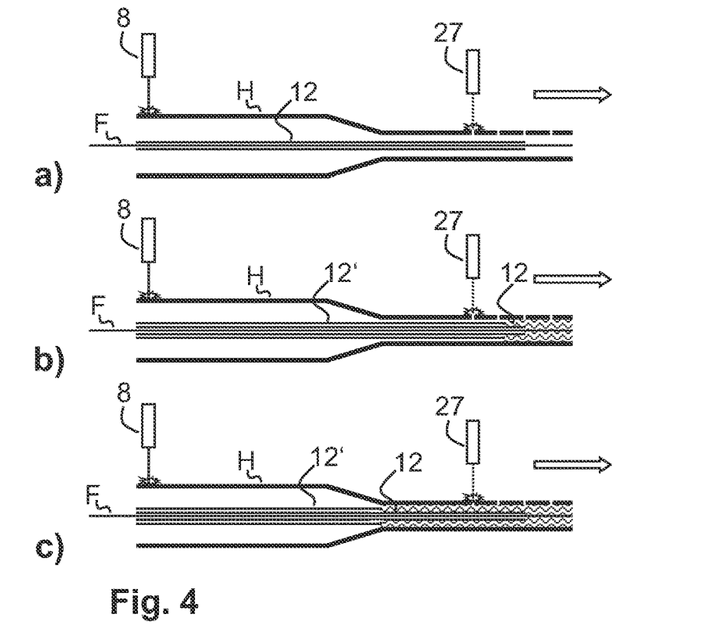
FIG. 4 shows various arrangements given by way of example of the guiding and protective tubes in the application of the method according to the invention or in a device according to the invention.

FIG. 4 shows various arrangements by way of example of the guide and protective tubes in the application of the method according to the invention or in a device according to the invention.

In FIG. 4 *a*), a fibre waveguide F is introduced into a metal hollow profile H in a guide or protective tube 12. The guide or protective tube 12 in this case runs under a laser welding device 8 to beyond a drilling device 27, into the metal hollow profile perforated by the drilling device. Between the laser welding device 8 and the drilling device 27 there takes place a reduction of the outside diameter of the metal hollow profile H. The arrow on the right-hand side of the figure indicates the drawing-off direction of the metal hollow profile.

FIG. 4 *b*) illustrates a similar arrangement as FIG. 4 *a*). In addition, however, here a filler gel is introduced into the metal hollow profile H. The filler gel may for example be conducted to beyond the drilling device 27 via a further tube 12' surrounding the guide or protective tube 12, before it enters the metal hollow profile H.

FIG. 4 c) illustrates a variant of the arrangement from FIG. 4 b) in which the filler gel enters the metal hollow profile already after the reduction of the outside diameter of the metal hollow profile H but before the drilling device 27. The further tube 12', surrounding the guide or protective tube 12, correspondingly ends here before that.

In the case of all the arrangements illustrated in FIG. 4, the guide or protective tube 12 and also possibly the further tube 12' surrounding the guide or protective tube 12 can be gradually withdrawn from the metal hollow profile counter to the drawing-off direction, until the fibre waveguide lies free under the drilling device 27, and production must be interrupted.

Figure 5:
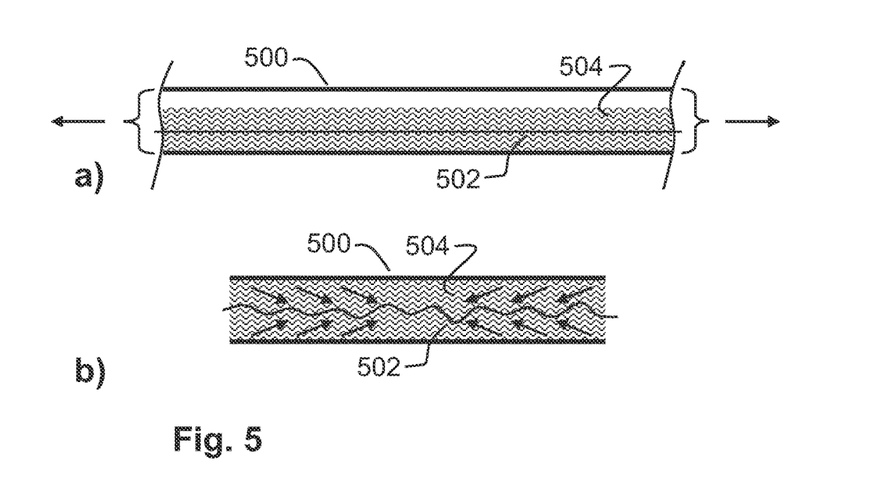
FIG. 5 shows a simplified representation of the mounting of a fibre waveguide in a filler gel in the interior of an elastically stretched and longitudinally stress-free metal hollow profile.

FIG. 5 shows a greatly simplified representation of the mounting of a fibre waveguide 502 in a filler gel 504 in the interior of an elastically stretched metal hollow profile 500 and of a metal hollow profile 500 which is free from longitudinal stresses. The representations in FIG. 5 are not to scale.

In FIG. 5 a), a tensile stress which elastically stretches the metal hollow profile 500 is being exerted on the metal hollow profile 500, as indicated by the arrows pointing away from one another at the ends of the illustrated part. It is assumed that the metal hollow profile 500 is only stretched in terms of length, and no change in diameter occurs. The metal hollow profile 500 has not been completely filled with the filler gel 504, but rather a clearance 506 remains at the upper side. The fibre waveguide 502 has been embedded in a stress-free state into the filler gel. Prior to the removal of the tensile stress, the temperature of the arrangement is lowered, such that the viscosity of the filler gel 504 increases. The increasing viscosity increases the friction between the inner side of the metal hollow profile 500 and the filler gel 504, and the friction between the filler gel 504 and the fibre waveguide 502.

In FIG. 5 b), a tensile stress is no longer being exerted on the metal hollow profile 500. The increased viscosity of the filler gel 504 owing to the cooling has transmitted a part of the longitudinal shrinkage movement of the metal hollow profile 500 to the fibre waveguide 502, such that a force acting in the longitudinal direction of the fibre waveguide 502 that would compress the fibre waveguide acts. The force is illustrated in the figure by the arrows pointing towards one another. The fibre waveguide 502 cannot absorb this force, but rather deflects it in a lateral direction, resulting in buckled compression. As a result of the buckled compression, a greater length of the fibre waveguide 502 than would correspond to the stress-free length of the metal hollow profile 500 is mounted in the metal hollow profile per section of length of the metal hollow profile 500. Owing to the reduction of the volume, the filler gel 504 then completely fills the metal hollow profile 500. Here, the fibre waveguide 502 is free from stresses apart from relatively low bending moments, and can stretch again in the event of an expansion of the metal hollow profile 500, for example owing to warming.

LIST OF REFERENCE DESIGNATIONS

| R | Tube segment | 26 | Movable guide |
|---|---|---|---|
| L | Round hole / elliptical hole | 27 | Drilling device |
| D1, D2 | Diameter | 100 | Method |
| F | Fibre waveguide | 102 | Supply metal strip |
| H | Hollow profile | 104 | Determine tensile force |
| 1 | Metal strip | 106 | Trim edges |
| 2 | Coil / unwinder | 108 | Form hollow profile |
| 3 | Forming tool | 109 | Supply fibre waveguide/filler gel |
| 4 | Cutting unit | 110 | Welding |
| 5 | Measuring device | 110a | Determine temperature profile |
| 6 | Guide elements | | |
| 7 | Closing dies / bushings | 110b | Determine dimensions |
| 8 | Laser welding device | 111 | Reduce dimension |
| 9 | Fibre unwinder | 112 | Perforate hollow profile |
| 10 | Fibre guide | 114 | Determine temperature |
| 11 | First measuring unit | 116 | Set temperature |
| 12, 12' | Guide/protective tube | 118 | Determine quality |
| 13 | Gel filling unit | 120 | Elastic stretching |
| 14 | Filling hose | 121 | Monitor tensile force |
| 15 | Filling head | 122 | Cool |
| 16 | Feeding unit | 123 | Measure received length |
| 17 | Tube cooling means | | |
| 18 | Feeding unit | 124 | Receive in receiving unit |
| 19 | Drawing die mounts | | |
| 20 | Draw-off capstan | 126 | Determine the excess length |
| 21 | Force measuring unit | | |
| 22 | Feeding unit | 128 | Record controlled variable(s) |
| 23 | Drawing die mounts | 130 | Determine manipulated variable(s) |
| 24 | Second measuring unit | 200 | Device |
| 25 | Winder | | |

The invention claimed is:

1. A method for the continuous production of a thin-walled, perforated metal hollow profile with one or more optical fiber waveguides disposed mounted therein, comprising:

supplying a flat metal strip at a first feeding speed to a forming device, continuously forming the supplied flat metal strip into a metal hollow profile with a slot extending in a longitudinal direction, wherein two opposing edges of the metal strip deformed into the metal hollow profile abut flush against one another in a contact region extending in the longitudinal direction of the metal hollow profile and are continuously welded to one another in a welding device, pulling away the welded metal hollow profile from the welding region, said method furthermore comprising:

perforating the welded metal hollow profile using a drilling device arranged on the take-off side at a perforation point located behind the welding device, positioning a guide or protective tube running under the welding region and extending into the welded metal hollow profile on the take-off side beyond the perforation point, supplying one or more optical fiber waveguides from one or more fiber unwinders through the guide or protective tube, such that the optical fiber waveguide or waveguides are disposed into the perforated metal hollow profile by the guide or protective tube downstream of the perforation point in the take-off direction, and receiving the perforated metal hollow profile with the fiber waveguide or fiber waveguides disposed therein in a receiving unit.

2. The method according to claim 1, further comprising: reducing the cross-sectional dimensions of the welded metal hollow profile to a desired final size before the perforating.

3. The method according to claim 1, wherein the guide or protective tube protrudes into the metal hollow profile beyond the perforation point by a first length and is withdrawn from the metal hollow profile by a certain second length and/or is axially rotated by a specified angle after a specified number of drilled holes.

4. The method according to claim 1, wherein perforating comprises drilling holes into a wall of the metal hollow profile by means of a laser.

5. The method according to claim 1, furthermore comprising:
introducing a filler gel for embedding the fiber waveguide or waveguides in the filler gel within the metal hollow profile.

6. The method according to claim 1, wherein the optical fiber waveguide or waveguides is/are introduced into the perforated metal hollow profile with an excess length, further comprising:
elastic stretching of the perforated metal hollow profile by introducing a tensile force to the perforated metal hollow profile,
introducing the optical fiber waveguide or waveguides, or the waveguide or waveguides and the filler gel, into the stretched metal hollow profile, and
ending of the elastic stretching after the introduction of the optical fiber waveguide or waveguides, or the waveguide or waveguides and the filler gel, and before taking up in the receiving unit.

7. The method according to claim 6, further comprising:
continuously determining the lengths of the optical fiber waveguide or waveguides supplied in the unstretched state and of the metal hollow profile taken away after ending the elastic stretching, with the optical fiber waveguide or waveguides introduced therein, and
determining control variables or controlled variables for controlling one or more process parameters comprising the supply rate of the strip, power of the welding device, temperature and flow of the filler gel per unit of time, feed rate after the welding and tensile force for the elastic stretching, in order to set an excess length of the optical fiber waveguides received in the metal hollow profile.

8. The method according to claim 1, wherein the welding in performed by means of a laser welding device.

9. A device for the continuous production of thin-walled, perforated metal hollow profiles with one or more optical fiber waveguides mounted therein, comprising:
a supply unit configured for supplying a flat metal strip,
a deforming unit, which deforms the flat metal strip into the metal hollow profile, encircling the supplied fiber waveguide, such that opposing edges of the flat metal strip abut flush against one another in a butt-jointed manner,
a guide means between which the edges are held so as to abut flush against one another,
a welding device, which welds together the edges lying abutting flush against one another between the guide means,
wherein the device further comprises
a drilling device arranged behind the welding device on the take-off side, for perforating the welded metal hollow profile,
a supply device with one or more fiber unwinders, from which optical fiber waveguides are supplied and are introduced, through a guide or protective tube, into the welded metal hollow profile, wherein the guide or protective tube extends beyond the welding region and the perforation point in the welded metal hollow profile, and
a receiving unit, which receives the perforated metal hollow profile with the optical fiber waveguide or optical fiber waveguides embedded therein.

10. The device according to claim 9, further comprising:
a device for reducing the cross-sectional dimensions of the welded metal hollow profile, arranged between the welding device and the drilling device.

11. The device according to claim 9, wherein the guide or protective tube is mounted in an axially displaceable and/or rotatable manner, and is rotated by a certain angle and/or withdrawn by a certain distance from the metal hollow profile by means of a drive after a specified number of drilled holes.

12. The device according to claim 9, wherein, at a wavelength of a laser of the drilling device used for perforating, the material of the guide or protective tube has a lower energy absorption or a greater reflectivity than the material of the metal hollow profile.

13. The device according to claim 9, further comprising:
a gel filling unit, from which a filler gel is introduced into the welded metal hollow profile, via an annular gap set at a distance from an outlet opening for the fiber waveguide or waveguides.

14. The device according to claim 13, wherein the gel filling unit has a heatable reservoir, a heatable filling hose and/or a heatable filling head.

15. The device according to claim 9, further comprising:
a device for elastically stretching the perforated metal hollow profile, wherein the unstretched fiber waveguide or waveguides is/are introduced into the stretched metal hollow profile, and wherein the elastic stretching is ended before the metal hollow profile is provided to the receiving device.

* * * * *